(12) United States Patent
Brandt

(10) Patent No.: US 6,984,676 B1
(45) Date of Patent: *Jan. 10, 2006

(54) EXTRUSION OF SYNTHETIC WOOD MATERIAL

(75) Inventor: Jeffrey R. Brandt, Blacklick, OH (US)

(73) Assignee: Crane Plastics Company LLC, Columbus, OH (US)

( * ) Notice: Subject to any disclaimer, the term of this patent is extended or adjusted under 35 U.S.C. 154(b) by 102 days.

This patent is subject to a terminal disclaimer.

(21) Appl. No.: 10/247,918

(22) Filed: Sep. 20, 2002

Related U.S. Application Data

(60) Division of application No. 09/659,266, filed on Sep. 11, 2000, now abandoned, which is a continuation of application No. 08/735,329, filed on Oct. 22, 1996, now Pat. No. 6,117,924.

(51) Int. Cl.
*C08L 1/00* (2006.01)

(52) U.S. Cl. .................. 524/13; 425/378.1; 425/379.1; 425/382 R; 425/382.4; 524/35

(58) Field of Classification Search .................. 524/13, 524/35; 425/378.1, 379.1, 382 R, 382.4
See application file for complete search history.

(56) References Cited

U.S. PATENT DOCUMENTS

| | | | |
|---|---|---|---|
| 2,188,396 A | 1/1940 | Semon .......................... 18/55 |
| 2,489,373 A | 11/1949 | Gilman ........................ 260/37 |
| 2,519,442 A | 8/1950 | Delorme et al. .............. 260/37 |
| 2,558,378 A | 6/1951 | Petry ........................... 260/41 |
| 2,635,976 A | 4/1953 | Meiler et al. ................ 154/132 |
| 2,680,102 A | 6/1954 | Becher ....................... 260/17.3 |
| 2,789,903 A | 4/1957 | Lukman et al. ................. 92/21 |
| 2,935,763 A | 5/1960 | Newman et al. ............... 18/55 |
| 3,287,480 A | 11/1966 | Wechsler et al. ........... 264/122 |
| 3,308,218 A | 3/1967 | Wiegand ..................... 264/121 |
| 3,309,444 A | 3/1967 | Schueler ..................... 264/109 |
| 3,492,388 A | 1/1970 | Inglin-Knüsel ............. 264/129 |
| 3,493,527 A | 2/1970 | Schueler ..................... 260/17.2 |
| 3,562,373 A | 2/1971 | Logrippo .................... 264/118 |
| 3,645,939 A | 2/1972 | Gaylord .............. 260/17.4 GC |
| 3,671,615 A | 6/1972 | Price ........................... 264/39 |
| 3,711,232 A * | 1/1973 | Van Zon ..................... 425/150 |
| 3,864,201 A | 2/1975 | Susuki et al. ............... 161/160 |
| 3,867,493 A | 2/1975 | Seki .......................... 264/45.9 |
| 3,878,143 A * | 4/1975 | Baumann ..................... 524/13 |
| 3,879,505 A | 4/1975 | Boutillier et al. ............. 264/48 |
| 3,888,810 A | 6/1975 | Shinomura ........... 260/17.4 BB |
| 3,899,559 A | 8/1975 | Johnanson et al. ......... 264/115 |
| 3,922,328 A | 11/1975 | Johnson ..................... 264/46.1 |
| 3,931,384 A | 1/1976 | Forquer et al. ............. 264/120 |
| 3,943,079 A | 3/1976 | Hamed ................ 260/17.4 BB |
| 3,954,555 A | 5/1976 | Kole et al. ................... 162/136 |
| 3,956,541 A | 5/1976 | Pringle .......................... 428/2 |
| 3,956,555 A | 5/1976 | McKean ..................... 428/106 |
| 3,969,459 A | 7/1976 | Fremont et al. ............ 264/109 |
| 4,005,162 A | 1/1977 | Bucking ....................... 264/25 |
| 4,012,348 A | 3/1977 | Chelland et al. ........ 260/28.5 R |
| 4,016,232 A | 4/1977 | Pringle ....................... 264/112 |
| 4,016,233 A | 4/1977 | Pringle ....................... 264/122 |
| 4,018,722 A | 4/1977 | Baker ......................... 260/2.3 |
| 4,029,831 A | 6/1977 | Daunheimer ................ 427/264 |
| 4,045,603 A | 8/1977 | Smith ........................... 428/2 |
| 4,056,591 A | 11/1977 | Goettler et al. ............. 264/108 |
| 4,058,580 A | 11/1977 | Flanders ..................... 264/113 |
| 4,071,479 A | 1/1978 | Broyde et al. ............... 260/2.3 |
| 4,071,494 A | 1/1978 | Gaylord .................... 260/42.14 |
| 4,097,648 A | 6/1978 | Pringle ....................... 428/326 |
| 4,102,106 A | 7/1978 | Golder et al. ................. 52/533 |
| 4,107,110 A | 8/1978 | Lachowicz et al. .. 260/17.4 CL |
| 4,115,497 A | 9/1978 | Halmø et al. ............... 264/115 |
| 4,145,389 A | 3/1979 | Smith ........................ 264/40.7 |
| 4,157,415 A | 6/1979 | Lindenberg ................. 428/284 |
| 4,168,251 A | 9/1979 | Schinzel et al. ........ 260/17.4 R |
| 4,178,411 A | 12/1979 | Cole et al. .................. 428/310 |
| 4,181,764 A | 1/1980 | Totten ........................ 428/155 |
| 4,187,352 A | 2/1980 | Klobbie ....................... 521/79 |
| 4,191,798 A | 3/1980 | Schumacher et al. ......... 428/95 |
| 4,192,839 A | 3/1980 | Hayashi et al. ............. 264/45.5 |
| 4,198,363 A | 4/1980 | Noel ......................... 264/45.9 |
| 4,203,876 A | 5/1980 | Dereppe et al. ........ 260/17.4 R |
| 4,216,253 A * | 8/1980 | Bonnebat .................. 425/378.1 |
| 4,222,729 A * | 9/1980 | Ragazzini ................ 425/378.1 |
| 4,228,116 A | 10/1980 | Colombo et al. ........... 264/119 |
| 4,239,679 A | 12/1980 | Rolls et al. ............... 260/42.49 |
| 4,241,133 A | 12/1980 | Lund et al. ................. 428/326 |
| 4,244,903 A | 1/1981 | Schnause ..................... 264/68 |
| 4,248,743 A | 2/1981 | Goettler ............... 260/17.4 BB |
| 4,248,820 A | 2/1981 | Haataja ...................... 264/113 |
| 4,250,222 A | 2/1981 | Mavel et al. ................ 428/285 |
| 4,263,184 A | 4/1981 | Leo et al. ............ 260/17.4 CL |
| 4,263,196 A | 4/1981 | Schumacher et al. ...... 260/33.6 |

(Continued)

FOREIGN PATENT DOCUMENTS

DE        2042176         4/1971

(Continued)

OTHER PUBLICATIONS

Bibliography of Solid Phase Extrusion, pp. 187-195.

(Continued)

Primary Examiner—Edward J. Cain
(74) Attorney, Agent, or Firm—Standley Law Group LLP

(57) ABSTRACT

An extrusion process is described for the extrusion of a synthetic wood material. The process includes a significantly higher compression ratio through which the extruded product must pass. The higher compression ratio results in significantly improved product qualities.

14 Claims, 2 Drawing Sheets

U.S. PATENT DOCUMENTS

| | | | |
|---|---|---|---|
| 4,272,577 A | 6/1981 | Lyng | 428/112 |
| 4,273,688 A | 6/1981 | Porzel et al. | 260/17.4 R |
| 4,277,428 A | 7/1981 | Luck et al. | 264/118 |
| 4,290,988 A | 9/1981 | Nopper et al. | 264/112 |
| 4,297,408 A | 10/1981 | Stead et al. | 428/240 |
| 4,303,019 A | 12/1981 | Haataja et al. | 108/51.1 |
| 4,305,901 A | 12/1981 | Prince et al. | 264/176 R |
| 4,317,765 A | 3/1982 | Gaylord | 523/204 |
| 4,323,625 A | 4/1982 | Coran et al. | 428/361 |
| 4,376,144 A | 3/1983 | Goettler | 428/36 |
| 4,382,108 A | 5/1983 | Carroll et al. | 428/326 |
| 4,382,758 A | 5/1983 | Nopper et al. | 425/82.1 |
| 4,393,020 A | 7/1983 | Li et al. | 264/108 |
| 4,414,267 A | 11/1983 | Coran et al. | 428/288 |
| 4,420,351 A | 12/1983 | Lussi et al. | 156/62.4 |
| 4,430,281 A * | 2/1984 | Boylan | 264/141 |
| 4,430,468 A | 2/1984 | Schumacher | 524/109 |
| 4,440,708 A | 4/1984 | Haataja et al. | 264/109 |
| 4,480,061 A | 10/1984 | Coughlin et al. | 524/13 |
| 4,481,701 A | 11/1984 | Hewitt | 29/416 |
| 4,491,553 A | 1/1985 | Yamada et al. | 264/51 |
| 4,503,115 A | 3/1985 | Hemels et al. | 428/281 |
| 4,505,869 A | 3/1985 | Nishibori | 264/115 |
| 4,506,037 A | 3/1985 | Suzuki et al. | 521/82 |
| 4,508,595 A | 4/1985 | Gåsland | 162/158 |
| 4,518,552 A | 5/1985 | Matsuo et al. | 264/126 |
| 4,534,992 A * | 8/1985 | Taguchi | 426/656 |
| 4,562,218 A | 12/1985 | Fornadel et al. | 524/15 |
| 4,594,372 A | 6/1986 | Natov et al. | 523/208 |
| 4,597,928 A | 7/1986 | Terentiev et al. | 264/87 |
| 4,610,900 A | 9/1986 | Nishibori | 428/15 |
| 4,632,795 A * | 12/1986 | Huber | 264/115 |
| 4,645,631 A | 2/1987 | Hegenstaller et al. | 264/69 |
| 4,659,754 A | 4/1987 | Edwards et al. | 523/214 |
| 4,663,225 A | 5/1987 | Farley et al. | 428/290 |
| 4,687,793 A | 8/1987 | Motegi et al. | 523/200 |
| 4,708,055 A * | 11/1987 | Matsumoto | 99/484 |
| 4,717,742 A | 1/1988 | Beshay | 523/203 |
| 4,734,236 A | 3/1988 | Davis | 264/112 |
| 4,737,532 A | 4/1988 | Fujita et al. | 524/13 |
| 4,746,688 A * | 5/1988 | Bistak | 524/13 |
| 4,769,109 A | 9/1988 | Tellvik et al. | 162/123 |
| 4,769,274 A | 9/1988 | Tellvik et al. | 428/218 |
| 4,783,493 A | 11/1988 | Motegi et al. | 524/13 |
| 4,789,604 A | 12/1988 | van der Hoeven | 428/503 |
| 4,790,966 A | 12/1988 | Sandberg et al. | 264/39 |
| 4,791,020 A | 12/1988 | Kokta | 428/326 |
| 4,800,214 A | 1/1989 | Waki et al. | 521/84.1 |
| 4,801,495 A | 1/1989 | van der Hoeven | 428/286 |
| 4,818,604 A | 4/1989 | Tock | 428/319.9 |
| 4,820,749 A | 4/1989 | Beshay | 523/203 |
| 4,851,458 A | 7/1989 | Hopperdietzel | 523/205 |
| 4,859,248 A * | 8/1989 | Thaler | 127/32 |
| 4,865,788 A | 9/1989 | Davis | 264/112 |
| 4,889,673 A | 12/1989 | Takimoto | 264/118 |
| 4,894,192 A | 1/1990 | Warych | 264/68 |
| 4,915,764 A | 4/1990 | Miani | 156/244.19 |
| 4,927,572 A | 5/1990 | van der Hoeven | 264/22 |
| 4,927,579 A | 5/1990 | Moore | 264/101 |
| 4,935,182 A | 6/1990 | Ehner et al. | 264/112 |
| 4,960,548 A | 10/1990 | Ikeda et al. | 264/40.4 |
| 4,968,463 A | 11/1990 | Levasseur | 264/40.1 |
| 4,973,440 A | 11/1990 | Tamura et al. | 264/114 |
| 4,978,489 A | 12/1990 | Radvan et al. | 264/118 |
| 4,981,638 A * | 1/1991 | Schad | 264/297.2 |
| 4,988,478 A | 1/1991 | Held | 264/518 |
| 5,002,713 A | 3/1991 | Palardy et al. | 264/109 |
| 5,008,310 A | 4/1991 | Beshay | 524/13 |
| 5,009,586 A | 4/1991 | Pallmann | 425/311 |
| 5,030,409 A * | 7/1991 | Hisanaga | 425/387.1 |
| 5,049,334 A | 9/1991 | Bach | 264/122 |
| 5,057,167 A | 10/1991 | Gersbeck | 156/62.2 |
| 5,064,592 A | 11/1991 | Ueda et al. | 264/112 |
| 5,067,885 A * | 11/1991 | Stevenson | 425/131.1 |
| 5,075,057 A | 12/1991 | Hoedl | 264/115 |
| 5,075,359 A | 12/1991 | Castagna et al. | 524/13 |
| 5,078,937 A | 1/1992 | Eela | 264/109 |
| 5,082,605 A | 1/1992 | Brooks et al. | 264/40 |
| 5,087,400 A | 2/1992 | Theuveny | 264/115 |
| 5,088,910 A | 2/1992 | Goforth et al. | 425/142 |
| 5,096,046 A | 3/1992 | Goforth et al. | 198/604 |
| 5,096,406 A | 3/1992 | Brooks et al. | 425/205 |
| 5,110,663 A * | 5/1992 | Nishiyama | 264/104 |
| 5,120,776 A | 6/1992 | Raj et al. | 524/13 |
| 5,153,241 A | 10/1992 | Beshay | 524/8 |
| 5,194,461 A | 3/1993 | Bergquist et al. | 524/13 |
| 5,204,032 A * | 4/1993 | Ramamurthy | 524/272 |
| 5,219,634 A | 6/1993 | Aufderhaar | 428/156 |
| 5,234,652 A | 8/1993 | Woodhams et al. | 264/210.2 |
| 5,272,000 A | 12/1993 | Chenoweth et al. | 428/283 |
| 5,276,082 A | 1/1994 | Forry et al. | 524/504 |
| 5,288,772 A * | 2/1994 | Hon | 524/13 |
| 5,302,634 A | 4/1994 | Mushovic | 523/219 |
| 5,369,147 A | 11/1994 | Mushovic | 523/219 |
| 5,393,536 A | 2/1995 | Brandt et al. | 425/112 |
| 5,406,768 A | 4/1995 | Giuseppe et al. | 52/730.4 |
| 5,413,745 A | 5/1995 | Andersson | 264/68 |
| 5,422,170 A | 6/1995 | Iwata et al. | 428/218 |
| 5,435,954 A | 7/1995 | Wold | 264/115 |
| 5,441,801 A | 8/1995 | Deaner et al. | 428/326 |
| 5,458,834 A | 10/1995 | Faber et al. | 264/109 |
| 5,474,722 A | 12/1995 | Woodhams | 264/45.3 |
| 5,480,602 A | 1/1996 | Nagaich | 264/122 |
| 5,486,553 A | 1/1996 | Deaner et al. | 524/13 |
| 5,497,594 A | 3/1996 | Giuseppe et al. | 52/730.4 |
| 5,500,239 A * | 3/1996 | Hayward | 426/516 |
| 5,505,900 A | 4/1996 | Suwanda et al. | 264/477 |
| 5,516,472 A * | 5/1996 | Laver | 264/118 |
| 5,518,677 A | 5/1996 | Deaner et al. | 264/142 |
| 5,532,065 A | 7/1996 | Gübitz | 428/480 |
| 5,537,789 A | 7/1996 | Minke et al. | 52/313 |
| 5,539,027 A * | 7/1996 | Deaner | 524/13 |
| 5,574,094 A | 11/1996 | Malucelli et al. | 525/54.3 |
| 5,576,374 A | 11/1996 | Betso et al. | 524/451 |
| 5,585,155 A | 12/1996 | Heikkila et al. | 428/36.7 |
| 5,593,625 A | 1/1997 | Riebel et al. | 264/115 |
| 5,695,874 A | 12/1997 | Deaner et al. | 428/326 |
| 5,718,926 A * | 2/1998 | Dambrine | 425/131.1 |
| 5,725,939 A * | 3/1998 | Nishibori | 524/13 |
| 5,783,125 A | 7/1998 | Bastone et al. | 264/45.3 |
| 5,827,462 A | 10/1998 | Brandt et al. | 264/179 |
| 5,827,607 A | 10/1998 | Deaner et al. | 428/326 |
| 5,863,480 A | 1/1999 | Suwanda | 264/209.8 |
| 5,866,264 A | 2/1999 | Zehner et al. | 428/481 |
| 5,882,564 A | 3/1999 | Puppin | 264/177.16 |
| 5,948,524 A | 9/1999 | Seethamraju et al. | 428/326 |
| 5,951,927 A | 9/1999 | Cope | 264/54 |
| 5,985,429 A | 11/1999 | Plummer et al. | 428/220 |
| 6,007,656 A | 12/1999 | Heikkila et al. | 156/180 |
| 6,066,680 A | 5/2000 | Cope | 521/79 |
| 6,117,924 A * | 9/2000 | Brandt | 524/13 |
| 6,210,616 B1 | 4/2001 | Suwanda | 264/151 |

FOREIGN PATENT DOCUMENTS

| | | |
|---|---|---|
| DE | 44033/73 | 9/1973 |
| DE | 3801574 | 1/1988 |
| DE | 4033849 | 10/1990 |
| DE | 4221070 | 12/1993 |
| EP | 0269470 | 1/1988 |
| EP | 93306843.9 | 8/1993 |
| EP | 93306844.7 | 8/1993 |
| EP | 93306845.4 | 8/1993 |
| EP | 0586211 | 3/1994 |

| | | |
|---|---|---|
| EP | 0586212 | 3/1994 |
| EP | 0586213 | 3/1994 |
| EP | 0 747 419 A2 | 12/1996 |
| FR | 74 06548 | 2/1974 |
| FR | 2270311 | 2/1974 |
| FR | 76 28288 | 9/1976 |
| FR | 2365017 | 4/1978 |
| FR | 79 10288 | 4/1979 |
| FR | 2445885 | 8/1980 |
| FR | 84 07466 | 5/1984 |
| FR | 2564374 | 11/1985 |
| GB | 1443194 | 7/1976 |
| GB | 2036148 | 6/1980 |
| GB | 82 23635 | 8/1982 |
| GB | 2104903 | 3/1983 |
| GB | 86 04589 | 2/1986 |
| GB | 2171953 | 9/1986 |
| GB | 87 02959 | 2/1987 |
| GB | 87 02959 | 8/1987 |
| GB | 2186655 | 8/1987 |
| WO | PCT/SE90/00014 | 1/1990 |
| WO | WO 90/08020 | 7/1990 |

OTHER PUBLICATIONS

Henrici-Olivé et al., "Integral/Structural Polymer Foams: Technology, Properties and Applications" Springer-Verlag, Berlin, pp. 111-122.

Myers et al., "Wood flour and polypropylene or high-density polyethylene composites: influence of maleated polypropylene concentration and extrusion temperature on properties", "Wood Fiber/Polymer Composites: Fundamental Concepts, Processes, and Material Options", pp. 49-56.

Pornnimit et al., Extrusion of Self-Reinforced Polyethylene, University of Erlangen-Nürnberg, Germany, pp. 92-98.

Woodhams et al., Wood Fibers as Reinforcing Fillers for Polyolefins, Department of Chemical Engineering and Applied Chemistry, University of Toronto, Canada, pp. 1166-1171.

Dalväg et al., The Efficiency of Cellulosic Fillers in Common Thermoplastics. Part II. Filling with Processing Aids and Coupling Agents, 1985, vol. 11, pp. 9-38.

Fiberloc Polymer Composites, B.F. Goodrich, Geon Vinyl Division, section 1, pp. 2-15.

Klason et al., The Efficiency of Cellulosic Fillers in Common Thermoplastics. Part 1. Filling without Processing Aids or Coupling Agents, Polymeric Materials, 1984, vol. 10, pp. 159-187.

Kokta et al., Composites of Poly(Vinyl Chloride) and Wood Fibers. Part II: Effect of Chemical Treatment, Polymer Composites, Apr. 1990, pp. 84-89.

Kokta et al., Composites of Polyvinyl Chloride-Wood Fibers. I. Effect of Isocyanate as a Bonding Agent, Polym.-Plast. Technol. Eng., 1990, 29(1&2), pp. 87-118.

Kokta et al., Composites of Polyvinyl Chloride-Wood Fibers. III: Effect of Silane as Coupling Agent, Journal of Vinyl Technology, Sep. 1990, pp. 146-153.

Kokta et al., Use of Grafted Wood Fibers in Thermoplastic Composites v. Polystyrene, Centre de recherche en pâtes et papiers, Université du Québec à Trois-Rivières, Canada.

Kokta et al., Use of Wood Fibers in Thermoplastic Composites, Polymer Composites, Oct. 1983, pp. 229-232.

Maldas et al., Composites of Polyvinyl Chloride-Wood Fibers: IV. Effect of the Nature of Fibers, Journal of Vinyl Technology, Jun. 1989, pp. 90-98.

Myers et al., Bibliography: Composites from Plastics and Wood-Based Fillers, USDA Forest Products Laboratory, Madison, WI, pp. 1-27 odds (1991).

Myers et al., Effects of Composition and Polypropylene Melt Flow on Polypropylene-Waste Newspaper Composites, ANTEC, 1984, pp. 602-604.

Raj et al., Use of Wood Fiber as Filler in Common Thermoplastics: Studies on Mechanical Properties, Science and Engineering of Composite Materials, vol. 1, No. 3, 1989, pp. 85-98.

Raj et al., Use of Wood Fibers in Thermoplastics. VII. The Effect of Coupling Agents in Polyethylene-Wood Fiber Composites, Journal of Applied Polymer Science, vol. 37, pp. 1089-1103 (1989).

Rogalski et al., Poly(Vinyl-Chloride) Wood Fiber Composites, ANTEC, 1987, pp. 1436-1440.

Sonwood outline, Apr. 1975.

Sonwood: a new PVC wood-flour alloy for Extrusions and other Plastic Processing Techniques, Sonesson Plast AB, Malmo, Sweden.

Thomas et al., Wood Fibers for Reinforcing Fillers for Polyolefins, ANTEC, 1984, pp. 687-689.

Woodhams et al., Wood Fibers for Reinforcing Fillers for Polyolefins, Polymer Engineering and Science, Oct. 1984, pp. 1166-1171.

Yam et al., Composites from Compounding Wood Fibers With Recycled High Density Polyethylene, Polymer Engineering and Science, mid-Jun. 1990, pp. 693-699.

Zadorecki et al., Future Prospects for Wood Cellulose as Reinforcement In Organic Polymer Composites, Polymer Composites, Apr. 1989, pp. 69-77.

Brzoskowski et al., Air-Lubricated Die for Extrusion of Rubber Compounds, Rubber Chemistry and Technology, vol. 60, pp. 945-956.

Collier et al., High Strength Extrudates by Melt Transformation Coextrusion, ANTEC, 1987, pp. 497-502.

Collier et al., Streamlined Dies and Profile Extrusion, ANTEC, 1987, pp. 203-206.

Bendtsen et al., Mechanical Properties of Wood, pp. 4-2 to 4-44.

Techno Material, Techno Material Co., Ltd.

Company News, Plastics Industry News, May 1994, pp. 70-71.

Fill Thermoplastics with Wood, Modern Plastics, May 1974, pp. 54-55.

Fillers for Thermoplastics: Beyond Resin Stretching, Modern Plastics International, Oct. 1976, pp. 12-15.

From Sweden: Extruded Interior Trim Made of PVC and Wood Flour, Plastic Building Construction, vol. 9 No. 5, 1986, pp. 5-6.

Maldas, et al.. Improving Adhesion of Wood Fiber with Polystrene by the Chemical Treatment of Fiber with a Coupling Agent and the Influence on the Mechanical.

Maldas, et al.. Improving Adhesion of Wood Fiber with Polystrene by the Chemical Treatment of Fiber with a Coupling Agent and the Influence on the Mechanical Properties of Composites, Journal of Adhesion Science Technology, vol. 3 No. 7, pp. 529-539 (1989).

Resin Stretching: Accent on Performance, Modern Plastic International, Jan. 1974, pp. 58-60.

Yuskova, et al., Interaction of Components in Poly(Vinyl Choloride) Filled in Polymetization, Makroniol Chem., Macromol. Symp. 29, 315-320 (1989).

Properties of Composites, Journal of Adhesion Science Technology, vol. 3 No. 7, pp. 529-539 (1989).

* cited by examiner

EXTRUSION OF SYNTHETIC WOOD MATERIAL

This application is a divisional of U.S. application Ser. No. 09/659,266, filed Sep. 11, 2000 now abandoned, which is continuation of U.S. application Ser. No. 08/735,329, filed Oct. 22, 1996, now U.S. Pat. No. 6,117,924.

BACKGROUND AND SUMMARY OF THE INVENTION

The present invention relates generally to wood replacement materials. In particular, the present invention relates to a wood-polymer composite material suitable for use in place of natural wood. The present invention includes a process for manufacturing the composite materials.

For several reasons, there is a need to find other materials that exhibit the look and feel of natural wood. One reason has to do with the supply of good wood for construction purposes from the world's forests. The supply of wood from mature trees has become an important issue in recent years and as a result the cost of wood has risen.

Several attempts have been made by others to find a wood like material. Many of these efforts have failed due to the poor qualities of the resultant product.

In addition to natural wood, other materials such as particle board, wafer board, and the like may be replaced by the synthetic wood of the present invention. One noticeable improvement over these materials is that synthetic wood has enhanced moisture resistance.

The present invention overcomes many of the disadvantages of the prior art attempts at a quality wood replacement material that is capable of being produced in a commercially practicable production environment. The present invention includes the combining of cellulosic material with a thermoplastic material and optionally with a cross-linking agent to form a combined product.

In the present invention an extrusion of the combined product under sufficient conditions to blend the combined product into a homogeneous mixture is described. The mixture of material is extruded through at least one die in a manner described in greater detail hereinafter.

The extruder preferably comprises a hopper to receive and mix the organic fibrous material and the thermoplastic material before being extruded through the die system. In an exemplary material composition of the present invention, the synthetic wood material includes approximately two-thirds organic fibrous or cellulosic material and approximately one-third thermoplastic material in combination. The resultant product has an appearance similar to wood and may be sawed, sanded, shaped, turned, fastened and/or finished in the same manner as natural wood. The resultant product is resistant to rot and decay as well as termite attack. The resultant product may be used for example as, decorative moldings inside or outside of a house, picture frames, furniture, porch decks, window moldings, window components, door components, roofing systems, and any other type of use where structural requirements do not exceed the physical properties of the resultant material.

The present invention is useful in a number of different extrusion environments in which at least one extrusion die and a packer are employed. More particularly, in an exemplary embodiment of the present invention, it is useful in conjunction with the synthetic wood composition and method as described in U.S. Pat. No. 5,516,472, which issued on May 14, 1996, entitled EXTRUDED SYNTHETIC WOOD COMPOSITION AND METHOD FOR MAKING SAME.

DETAILED DESCRIPTION OF EXEMPLARY EMBODIMENT(S)

Figure 1:
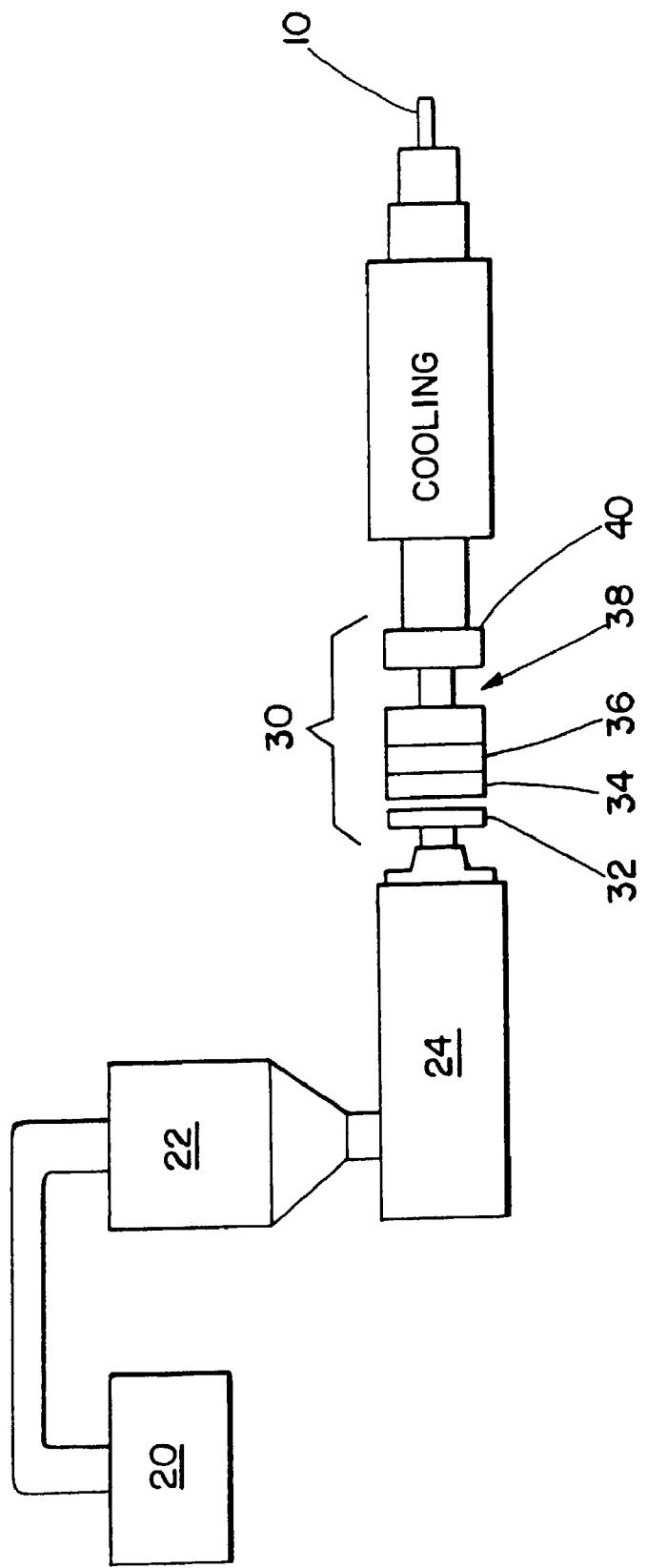
FIG. 1 is a schematic diagram illustrating the process of the present invention.
Figure 2:
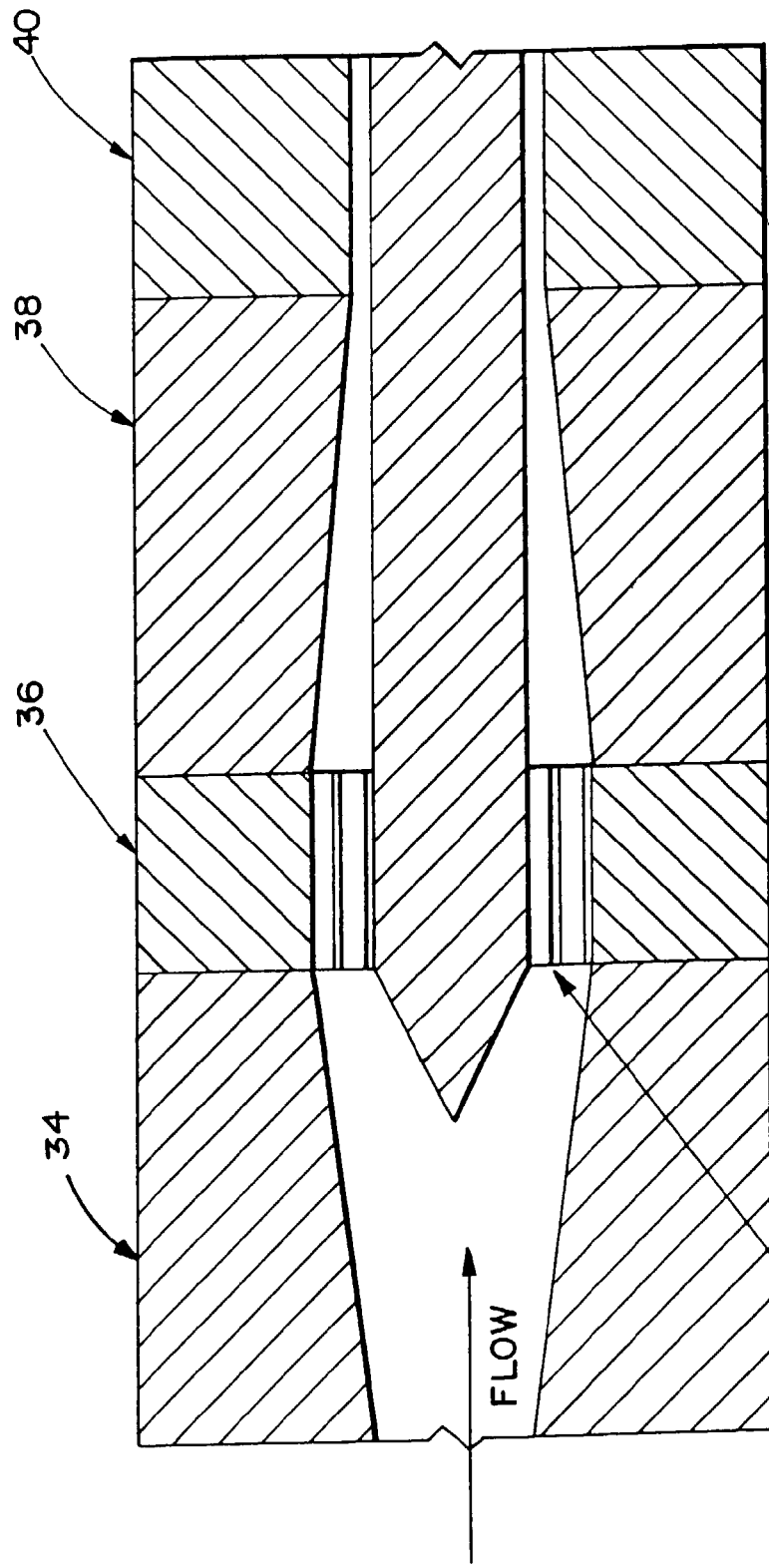
FIG. 2 is a cross-sectional view of a die system of an exemplary embodiment of the present invention.

The present invention is directed toward synthetic wood extrusions of the type in which synthetic wood material composites are extruded through at least one die into and adjacent a profile or packer component. The die may produce strands of the composite material that flow into the packer or in another embodiment of the invention, the die may simply produce one flowable homogeneous mass of material into the packer. In either case, the essence of the present invention is that the packer is of a substantially reduced cross-section area from that of the adjacent die, causing the composite extruded material to be shaped as it passes through the packer.

A compression ratio of about 1.5 to 1 up to about 3.5 to 1 or higher is preferred. For example, when a plate of a die through which material is extruded has an equal cross-sectional area as the cross-sectional area of the packer, the compression ratio is said to be 1 to 1. When the cross-sectional area of extrusion of the plate of a die is twice the size of the cross-sectional of the packer opening, the compression ratio is said to be 2 to 1.

Surprising and dramatically improved results were achieved when the compression ratio was increased from about 1 to 1 to 1.5 to 1 and higher. One noticeable improvement is that nails driven through material produced with a 2 to 1 compression ratio did not cause significant cracks in the product while nails driven through material produced at a 1 to 1 compression ratio exhibited significant cracks in the cross-section area of the material.

Another surprising and beneficial result occurred when the length of the packer was reduced by about half of its previous length. Originally, with extrusions of the present invention, a packer length of 8 inches was employed. Later, upon refinement of the invention, it was discovered that a packer length of about 4 inches improved the efficiency of the manufacturing process at least in the fact that it resulted in less cost to make each packer and the performance was equal to or better than the prior 8 inch length packer.

As the strands or mass of material, in an exemplary embodiment, leave the stranding die and enter the packer, the material 10 is compressed causing the material to bond to adjacent material strands. In a packer, the final shape is maintained while the cross linking agents continue to react which bond the material together along with the individual cellulose molecular chains. The formed product is then cooled in a cooling tank 16 and transported to an area where it may be cut into desired lengths.

The cellulosic fibrous-polymer composite material used in the present invention may have a higher cellulosic fiber content then normally recognized. The overall process may include the mixing of raw materials including cellulosic fibers, thermoplastic materials, cross-linking agents and process lubricants. The cellulosic material may be any one or more cellulosic materials such as sawdust, newspapers, alfalfa, wheat pulp, wood chips, wood fibers, wood particles, ground wood, wood flour, wood flakes, wood veneers, wood laminates, paper, cardboard, straw, cotton, rice hulls, coconut shells, peanut shells, bagass, plant fibers, bamboo or palm fiber, and kenaf. Cellulosic material is first dried to a low moisture content. Although apparently not critical, an exemplary moisture content is about 1% to about 10%.

Thermoplastic materials may include multilayer films, polyethylene, polypropylene, poly-vinyl chloride (PVC), low density polyethylene (LDPE), ethyl-vinyl acetate, other polyethylene copolymers and other thermoplastics.

Examples of cross-linking agents include polyurethanes, such as isocynate, phenolic resins, unsaturated polyesters and epoxy resins and combinations of the same. Lubricants may be added as a process aid. Examples of lubricants include zinc stearate or wax. Other materials may be added which are known to the art of extrusion and include accelerators, inhibitors, enhancers, compatibilizers and blowing agents.

Two example formulation recipes are described below:

|  | Amount (parts per total) |
|---|---|
| Recipe A |  |
| Wood Flour (40/mesh maple) | 250 |
| Polyethylene (HDPE) | 100 |
| Zinc Stearate | 7.5 |
| External Wax | 5 |
| Phenolic Resin | 15 |
| Isocyanate (MDI) | 2.5 |
| Recipe B |  |
| Wood Flour (40/mesh maple) | 250 |
| PVC | 100 |
| Lubricant (ester) | 3 |
| External Wax | 4 |
| Process Aids (acrylic) | 4 |
| Calcium Stearate | 2 |
| Tin Stabilizer | 2 |

In an exemplary embodiment of the present invention, the cellulosic fiber and thermoplastic raw materials are physically mixed with the cross-linking agents and lubricants in a blender 20, and subsequently placed into a feed hopper 22. The mixing of the materials may be accomplished by any simple mixing device. A typical feed hopper may be used such as a gravity feed hopper or a hopper with a force feed mechanism known as a crammer. Once the materials are properly mixed and transferred to the hopper, they are delivered utilizing a crammer feeder to a heated extruder 24. The extruder utilizes low temperature mixing and extruding. An exemplary mixing temperature at the extruder is around 330° F. Several well known extruders may be used in the present invention. A twin screw extruder by Cincinnati Milacron (CM-80-Hp) may be used. In the extruder, the materials are blended and heated and then forced into a die system. The flow rate of the extruder may be between about 150 and 600 pounds per hour. The die system 30 is made up of one or more plates. The die system allows the starting materials to bond and form a shaped-homogeneous product. A typical plate may be made from cast iron and stainless steel material.

In one embodiment the die system is comprised of a plurality of plates nested together to form one continuous die. The first die connected to the extruder is known as an adapter die 32. Following the adapter die is a transition die 34. The transition die transforms the combined material discharged from the round stock exiting the adapter die to a shape more generally approaching that of the finished product. Following the transition die may be a stranding die 36. The stranding die plate has multiple apertures which may be substantially round. In an exemplary embodiment, the stranding die contains apertures which are approximately one-eighth of an inch or larger in diameter. As the material leaves the stranding die it leaves in strands of homogeneous material which are compressed together in a compression die section 38. The compression die section is contemplated to take a shape of many common items such as decorative house hold moldings including crown moldings, chair rails, baseboards, door moldings, picture frames, furniture trim, and other products. After passing through the compression die section the material enters the setting die 40 where the final shape is maintained. This setting die is also known as the packer. The final shape is maintained yet substantially compressed in overall cross section area. A compression ratio at the packer of about 1.5 to 1 to about 3.5 to 1 provides substantial improvements in the quality of the finished product. With the higher compression ratio of the present invention the resultant product is less likely to crack, split, or otherwise fail in actual applications. The higher compression of the present invention results in a greater degree of material compaction and molecular adhesion.

The above described advantages and features of the present invention are offered as an example of the way in which the present invention may be commercially implemented. The embodiments listed herein are, therefore, exemplary in nature and are not intended to unnecessarily limit the scope of the following claims.

What is claimed is:

1. A synthetic wood component comprising:
   an extrusion of blended cellulosic material and thermoplastic material, said extrusion compressed in at least one die under heat and pressure at a ratio of at least about 1.5 to 1 to form a final shape and a final cross sectional area of said synthetic wood component;
   wherein the cross sectional area of said final shape has been compressed from an intermediate cross sectional area to said final cross sectional area, and the ratio of said intermediate cross sectional area to said final cross sectional area was at least about 1.5 to 1.

2. The synthetic wood component of claim 1 wherein the ratio of said intermediate cross sectional area to said final cross sectional area of said final shape was at least about 2 to 1.

3. The synthetic wood component of claim 2 wherein the ratio of said intermediate cross sectional area to said final cross sectional area of said final shape was at least about 3.5 to 1.

4. The synthetic wood component of claim 1 wherein said thermoplastic material includes polyethylene.

5. The synthetic wood component of claim 1 wherein said thermoplastic material includes polyvinyl chloride.

6. The synthetic wood component of claim 1 wherein said cellulosic material comprises about 60 percent to about 80 percent by weight of said extrusion.

7. A process for producing a component, said process comprising:
   providing a synthetic wood material comprising cellulosic material and thermoplastic material;
   extruding said synthetic wood material through a die system to form a final shape having an intermediate cross sectional area; and compressing said synthetic wood material in said die system at a ratio of at least about 1.5 to 1 to form a final cross sectional area of said final shape of said component.

8. The process of claim 7 wherein the ratio of said intermediate cross sectional area to said final cross sectional area is at least about 2 to 1.

9. The process of claim 8 wherein the ratio of said intermediate cross sectional area to said final cross sectional area is at least about 3.5 to 1.

10. The process of claim 7 wherein said die system has a first aperture and a second aperture, said first aperture having said intermediate cross sectional area, said second aperture having said final cross sectional area;
   wherein said synthetic wood material enters said die system through said first aperture and exits said die system through said second aperture; and
   wherein said synthetic wood material exits said second aperture in said final shape of said component.

11. The process of claim 10 wherein said first aperture has substantially the same shape as said second aperture.

12. The process of claim 10 wherein:
   said die system is comprised of a first die and a second die, said first die having said first aperture and a third aperture, said second die having a fourth aperture and said second aperture, said first die connected to said second die such that said synthetic wood material exits said first die through said third aperture and enters said second die through said fourth aperture;
   said synthetic wood material exits said third aperture of said first die substantially in said final shape and said final cross sectional area of said component; and
   said second die substantially maintains said final shape and said final cross sectional area of said component.

13. The process of claim 12 further comprising the step of stranding said synthetic wood material prior to compressing said synthetic wood material in said die system at a ratio of at least about 1.5 to 1.

14. A process of producing a component, said process comprising:
   providing a synthetic wood material comprising cellulosic material and thermoplastic material;
   stranding said synthetic wood material;
   forming said synthetic wood material into a final shape of said component having an intermediate cross sectional area; and
   compressing said final shape from said intermediate cross sectional area to a final cross sectional area;
   wherein the ratio of said intermediate cross sectional area to said final cross sectional area is at least about 1.5 to 1.

* * * * *

UNITED STATES PATENT AND TRADEMARK OFFICE
CERTIFICATE OF CORRECTION

PATENT NO. : 6,984,676 B1  Page 1 of 1
DATED : January 10, 2006
INVENTOR(S) : Brandt It is certified that error appears in the above-identified patent and that said Letters Patent is hereby corrected as shown below:

<u>Title page,</u>
Item [56], References Cited, U.S. PATENT DOCUMENTS, insert:
-- 5,847,016   12/1998   Cope      521/84.1
   6,579,605   6/2003    Zehner    428/319.9
   6,590,004   7/2003    Zehner    521/84.1 --.

Signed and Sealed this

Sixteenth Day of May, 2006

JON W. DUDAS
*Director of the United States Patent and Trademark Office*